(12) United States Patent
Watanabe et al.

(10) Patent No.: US 9,058,328 B2
(45) Date of Patent: Jun. 16, 2015

(54) SEARCH DEVICE, SEARCH METHOD, SEARCH PROGRAM, AND COMPUTER-READABLE MEMORY MEDIUM FOR RECORDING SEARCH PROGRAM

(75) Inventors: Kazufumi Watanabe, Chofu (JP); Makoto Okabe, Chofu (JP); Rikio Onai, Chofu (JP); Masahiro Sanjo, Shinagawa-ku (JP); Hiromi Hirano, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/989,933

(22) PCT Filed: Feb. 24, 2012

(86) PCT No.: PCT/JP2012/054663
§ 371 (c)(1),
(2), (4) Date: May 28, 2013

(87) PCT Pub. No.: WO2012/115254
PCT Pub. Date: Aug. 30, 2012

(65) Prior Publication Data
US 2014/0012853 A1    Jan. 9, 2014

(30) Foreign Application Priority Data
Feb. 25, 2011    (JP) .................. 2011-040259

(51) Int. Cl.
*G06F 17/30*    (2006.01)
(52) U.S. Cl.
CPC .... *G06F 17/30011* (2013.01); *G06F 17/30699* (2013.01)

(58) Field of Classification Search
CPC .............. G06F 17/30011; G06F 17/30699
See application file for complete search history.

(56) References Cited

U.S. PATENT DOCUMENTS

| | | |
|---|---|---|
| 6,721,748 B1* | 4/2004 | Knight et al. ............... 1/1 |
| 6,751,614 B1* | 6/2004 | Rao ............................ 1/1 |
| 6,859,807 B1* | 2/2005 | Knight et al. ............... 1/1 |
| 2002/0178155 A1* | 11/2002 | Sakurai ..................... 707/3 |
| 2003/0033333 A1* | 2/2003 | Nishino et al. .......... 707/531 |
| 2003/0220922 A1* | 11/2003 | Yamamoto et al. ........ 707/7 |
| 2005/0234877 A1* | 10/2005 | Yu ............................ 707/3 |

(Continued)

OTHER PUBLICATIONS

Allan, et al., Topic Detection and Tracking Pilot Study Final Report, 1998.*

(Continued)

*Primary Examiner* — Neveen Abel Jalil
*Assistant Examiner* — Kristofer Biskeborn
(74) *Attorney, Agent, or Firm* — Sughrue Mion, PLLC

(57) ABSTRACT

A search server includes an extracting unit that extracts a search target matching a search condition based on profile data, and a transmitting unit that transmits the search target to a user terminal. The search condition includes a first frequency of appearance for each of one or more specified topics specified by a user in a first specified period and a second frequency of appearance for each of the specified topics in a second specified period being later than the first specified period. The extracting unit extracts the search target where the frequency of appearance for each of the specified topics in a first search target period and a second search target period being later than the first search target period are identical or similar to the first frequency of appearance and the second frequency of appearance, respectively.

9 Claims, 15 Drawing Sheets

(56) References Cited

U.S. PATENT DOCUMENTS

| | | | |
|---|---|---|---|
| 2006/0085788 A1* | 4/2006 | Amir et al. .................... | 718/100 |
| 2007/0005646 A1* | 1/2007 | Dumais et al. ............. | 707/104.1 |
| 2007/0214137 A1* | 9/2007 | Gloor ................................ | 707/6 |
| 2008/0215607 A1* | 9/2008 | Kaushansky et al. ......... | 707/102 |
| 2008/0288489 A1* | 11/2008 | Kim ................................. | 707/6 |
| 2009/0049037 A1* | 2/2009 | Gross ............................... | 707/5 |
| 2009/0055359 A1* | 2/2009 | Gross ............................... | 707/3 |
| 2009/0276411 A1* | 11/2009 | Park et al. ......................... | 707/5 |
| 2009/0319518 A1* | 12/2009 | Koudas et al. .................... | 707/5 |
| 2010/0023311 A1* | 1/2010 | Subrahmanian et al. ......... | 704/2 |
| 2010/0100537 A1 | 4/2010 | Druagalski et al. | |
| 2010/0119053 A1 | 5/2010 | Goeldi | |

OTHER PUBLICATIONS

Fiscus, et al., Topic Detection and Tracking Evaluation Overview, 2002.*

Krause, et al., Data Association for Topic Intensity Tracking, 2006.*

Rajaraman, et al, Topic Detection, Tracking, and Trend Analysis Using Self-Organizing Neural Networks, 2001.*

Bolelli, et al., Topic and Trend Detection in Text Collections Using Latent Dirichlet Allocation, 2009.*

Haveliwala, TopicSensitive PageRank, 2002.*

Wang, et al., Topics over Time: A Non-Markov Continuous-Time Model of Topical Trends, 2006.*

International Preliminary Report on Patentability with Written Opinion dated Sep. 6, 2013, issued in International Application No. PCT/JP2012/054663.

Kazufumi Watanabe, et al., "Blogger Search based on Interest Analysis", Dai 3 Kai Forum on Data Engineering and Information Management Ronbunshu, Aug. 4, 2011, pp. 1-5.

Xuerui Wang, et al., "Topics over Time: A Non-Markov Continuous-Time Model of Topical Trends", KDD-2006, Proceedings of the Twelfth ACM SIGKDD International Conference on Knowledge Discovery and Data Mining, ACM Press, Aug. 20-23, 2006, pp. 424-433, New York, NY, USA.

* cited by examiner

*Fig.4*

PROFILE DATA

| WRITER ID |
|---|
| DOCUMENT ID |
| CREATION TIME |
| NUMBER OF WORDS ASSIGNED TO TOPIC 0 (FREQUENCY OF APPEARANCE OF TOPIC 0) |
| NUMBER OF WORDS ASSIGNED TO TOPIC 1 (FREQUENCY OF APPEARANCE OF TOPIC 1) |
| NUMBER OF WORDS ASSIGNED TO TOPIC 2 (FREQUENCY OF APPEARANCE OF TOPIC 2) |
| ⋮ |
| NUMBER OF WORDS ASSIGNED TO TOPIC 98 (FREQUENCY OF APPEARANCE OF TOPIC 98) |
| NUMBER OF WORDS ASSIGNED TO TOPIC 99 (FREQUENCY OF APPEARANCE OF TOPIC 99) |

*Fig.5*

| FREQUENT WORD | TOPIC |
|---|---|
| ... | ... |
| USE, PC, FORM, ITEM NAME A, ITEM NAME B, MODEL | TOPIC n1 (DIGITAL DEVICE) |
| GAME, ROOTING, BATTLE, BASEBALL, TEAM, PLAYER, TEAM X, TEAM Y | TOPIC n2 (BASEBALL) |
| COLD, THIS YEAR, AUTUMN, DEGREE, PHYSICAL CONDITION, WINTER, CARE, SEASON, THROAT, ENERGY | TOPIC n3 (COLD) |
| COLD, MOON, HEART, BEAUTIFUL, SEA, SKY, FLOWER, WATER, STAR, LIGHT, NIGHT | TOPIC n4 (NATURE) |
| CAT, DOG, MOUNTAIN, WALK, HOME, RIVER, BEAR, BIRD, WOODS, INSECT | TOPIC n5 (PET) |
| ... | ... |

Fig.6

| FREQUENT WORD | TOPIC |
|---|---|
| ... | ... |
| HOUR, MINUTE, DEGREE, TIME, AFTERNOON, SECOND, MORNING, HALF PAST, ANNOUNCEMENT | TOPIC m1 (TIME) |
| (´д`), ´(`, (:´, (°, *´ | TOPIC m2 (ASCII ART) |
| TODAY, RAIN, MORNING, WEATHER, YESTERDAY, THIS MORNING, DAY, UMBRELLA | TOPIC m3 (WEATHER) |
| YES, NO WAY, ABSOLUTELY, NO, DISLIKE, MOUTH, THIS | TOPIC m4 (FEELING) |
| MONEY→EASY, WAY, PACKAGE, COMPLETE, SUCCESS | TOPIC m5 (ADVERTISEMENT) |
| ... | ... |

Fig.7

| PARENT TOPIC | EXTRACTED TOPIC |
|---|---|
| IT | DIGITAL DEVICE, MOBILE, ... |
| LIFE | FASHION, COMPANIONSHIP, DRINKING AND EATING, EXERCISE, ROOM, CHILD-REARING, ... |
| POLITICS AND ECONOMIES | POLITICS, ECONOMICS, INTERNATIONAL, ... |
| ENTERTAINMENT | BASEBALL, ENTERTAINMENT, NATURE, LIVE MUSIC, ... |
| GAMES AND ANIMATIONS | GAME, ANIMATION, BOOK, DISTRIBUTION, ... |

SEARCH DEVICE, SEARCH METHOD, SEARCH PROGRAM, AND COMPUTER-READABLE MEMORY MEDIUM FOR RECORDING SEARCH PROGRAM

CROSS REFERENCE TO RELATED APPLICATIONS

This application is a National Stage of International Application No. PCT/JP2012/054663 filed Feb. 24, 2012, claiming priority based on Japanese Patent Application No. 2011-040259 filed Feb. 25, 2011, the contents of all of which are incorporated herein by reference in their entirety.

TECHNICAL FIELD

One aspect of the present invention relates to a search device, a search method, a search program, and a computer-readable memory medium for recording search program that perform search based on accumulated documents.

BACKGROUND ART

Dissemination of information through electronic documents such as blogs and microblogs has become common. Further, there are various techniques for analyzing the electronic documents. One of document analysis techniques is a technique of using a document generation model called a topic model. For example, the following Non Patent Literature 1 discloses a technique that introduces time-series information into the topic model and thereby visually presents the transition of trends from documents with time information.

CITATION LIST

Non Patent Literature

NPL1: Xuerui Wang and Andrew McCallum. Topics over time: a non-markov continuous-time model of topical trends. In Proceedings of the 12th ACM SICKDD international conference on Knowledge discovery and data mining, KDD '06, pp. 424-433. New York, N.Y., USA,

SUMMARY OF INVENTION

Technical Problem

On the other hand, because the number of disseminated electronic documents is enormous, it is not easy for individuals to encounter necessary information. The primary objective of the technique disclosed in the above Non Patent Literature 1 is finding highly influential writers, extracting topics, and extracting communities, and it does not provide information on a change in circumstances desired by users.

It is thus demanded to present information in accordance with a desired change in circumstances.

Solution to Problem

A search device according to one embodiment of the present invention includes a search means for extracting a search target matching a search condition specified by a user based on profile data generated based on a document extracted from a specified database, the profile data containing an identifier for identifying a search target, creation time of the document, and a frequency of appearance for each topic obtained by classifying words in the document into one or more topics, and an output means for outputting the search target extracted by the search means for presentation to a user, wherein the search condition includes a first frequency of appearance for each of one or more specified topics specified by the user in a first specified period and a second frequency of appearance for each of the specified topics in a second specified period being later than the first specified period, and the search means extracts the search target where the frequency of appearance for each of the specified topics obtained from the profile data in a first search target period is identical or similar to the first frequency of appearance and the frequency of appearance for each of the specified topics obtained from the profile data in a second search target period being later than the first search target period is identical or similar to the second frequency of appearance.

A search method according to one embodiment of the present invention is a search method performed by a search device, the method including a search step of extracting a search target matching a search condition specified by a user based on profile data generated based on a document extracted from a specified database, the profile data containing an identifier for identifying a search target, creation time of the document, and a frequency of appearance for each topic obtained by classifying words in the document into one or more topics and an output step of outputting the search target extracted in the search step for presentation to a user, wherein the search condition includes a first frequency of appearance for each of one or more specified topics specified by the user in a first specified period and a second frequency of appearance for each of the specified topics in a second specified period being later than the first specified period, and the search step extracts the search target where the frequency of appearance for each of the specified topics obtained from the profile data in a first search target period is identical or similar to the first frequency of appearance and the frequency of appearance for each of the specified topics obtained from the profile data in a second search target period being later than the first search target period is identical or similar to the second frequency of appearance.

A search program according to one embodiment of the present invention causes a computer to function as a search means for extracting a search target matching a search condition specified by a user based on profile data generated based on a document extracted from a specified database, the profile data containing an identifier for identifying a search target, creation time of the document, and a frequency of appearance for each topic obtained by classifying words in the document into one or more topics, and an output means for outputting the search target extracted by the search means for presentation to a user, wherein the search condition includes a first frequency of appearance for each of one or more specified topics specified by the user in a first specified period and a second frequency of appearance for each of the specified topics in a second specified period being later than the first specified period, and the search means extracts the search target where the frequency of appearance for each of the specified topics obtained from the profile data in a first search target period is identical or similar to the first frequency of appearance and the frequency of appearance for each of the specified topics obtained from the profile data in a second search target period being later than the first search target period is identical or similar to the second frequency of appearance.

A computer readable memory medium according to one embodiment of the present invention stores a search program causing a computer to function as a search means for extracting a search target matching a search condition specified by a user based on profile data generated based on a document extracted from a specified database, the profile data containing an identifier for identifying a search target, creation time of the document, and a frequency of appearance for each topic obtained by classifying words in the document into one or more topics, and an output means for outputting the search target extracted by the search means for presentation to a user, wherein the search condition includes a first frequency of appearance for each of one or more specified topics specified by the user in a first specified period and a second frequency of appearance for each of the specified topics in a second specified period being later than the first specified period, and the search means extracts the search target where the frequency of appearance for each of the specified topics obtained from the profile data in a first search target period is identical or similar to the first frequency of appearance and the frequency of appearance for each of the specified topics obtained from the profile data in a second search target period being later than the first search target period is identical or similar to the second frequency of appearance.

According to the above embodiments, a search target having two frequencies of appearance that are identical or similar to the frequencies of appearance for each specified topic in two periods (the first and second frequencies of appearance) is extracted. The search target is then output for presentation to a user. In this manner, by extracting a search target whose change in the frequency of appearance for a specified topic is identical or similar to the search condition, it is possible to present information corresponding to a desired change in circumstances to a user.

In the search device according to another embodiment, the search condition may further include a third frequency of appearance for each of the specified topics in each of one or more third specified periods between the first specified period and the second specified period, and the search means may extract the search target where the frequency of appearance in the first search target period is identical or similar to the first frequency of appearance, the frequency of appearance in the second search target period is identical or similar to the second frequency of appearance, and the frequency of appearance for each of the specified topics obtained from the profile data in each of one or more third search target periods corresponding to the one or more third specified periods in a before-after relationship in time is identical or similar to the corresponding third frequency of appearance.

In this case, a search target having a plurality of frequencies of appearance that are identical or similar to the frequencies of appearance for each specified topic in three or more periods is extracted, and the search target is then output. It is thus possible to make a search in consideration of the process of a change in circumstances, and it is thereby possible to present information corresponding to a desired change in circumstances to a user.

In the search device according to another embodiment, the search condition may further include a time interval between the specified periods adjacent to each other, and a time interval between the search target periods adjacent to each other may coincide with the corresponding time interval between the specified periods.

In this case, because a time interval between the specified periods is further set as the search condition, it is possible to present information corresponding to a desired change in circumstances and the speed of the change to a user.

In the search device according to another embodiment, the one or more topics indicated by the profile data may be topics left after eliminating specified unnecessary topics from a group of topics obtained based on the document extracted from the specified database.

In this case, because unnecessary topics are eliminated in advance, it is possible to increase the accuracy of a search.

In the search device according to another embodiment, the specified topics may be higher hierarchy topics including one or more topics indicated by the profile data.

In this case, by representing topics in a hierarchical structure, the topics of the profile data are integrated into higher hierarchy topics, and a search using the higher hierarchy topics as the specified topics is performed. By using such specified topics, the convenience of a search operation is enhanced.

In the search device according to another embodiment, in a case where there are a plurality of specified topics, when a percentage of a certain frequency of appearance for each specified topic with respect to a total of frequencies of appearance for each specified topic in one specified period is changed, percentages of other frequencies of appearance for each specified topic in the specified period may be adjusted in accordance with the change.

In the search device according to another embodiment, when the certain frequency of appearance for each specified topic in the one specified period is changed, the search target where the certain frequency of appearance for each specified topic obtained from the profile data in one search period corresponding to the one specified period is identical or similar to the changed certain frequency of appearance for each specified topic and the frequency of appearance for each specified topic obtained from the profile data in another search period corresponding to another specified period is identical or similar to the frequency of appearance for each specified topic in the another specified period may be extracted, and the percentages of the other frequencies of appearance for each specified topic may be adjusted based on the frequency of appearance for each specified topic of the search target in the one search period, and a before-after relationship between the one search period and the another search period may correspond to a before-after relationship between the one specified period and the another specified period.

In the search device according to another embodiment, the percentages of the other frequencies of appearance for each specified topic may be adjusted based on a weight indicating a strength of a relation between the specified topics, the weight set based on a frequency the words appear across a plurality of different topics, and an amount of change of the certain frequency of appearance for each specified topic.

In the above cases, when a user changes the frequency of appearance of a certain specified topic, the frequencies of appearance of the other specified topics are adjusted in accordance with the change, and thereby the convenience of a search operation is enhanced.

In the search device according to another embodiment, the search means may further extract additional information corresponding to the extracted search target or additional information corresponding to the frequency of appearance for each specified topic of the search target between the first search target period and the second search target period from an additional database, and the output means may further output the additional information extracted by the search means for presentation to a user.

In this case, because additional information corresponding to the extracted search target is also output, it is possible to present not only information corresponding to a desired change in circumstances but also the additional information to a user.

Advantageous Effects of Invention

According to one aspect of the present invention, a search target with the transition of the frequency of appearance for a specified topic being identical or similar to a search condition is extracted, and it is thereby possible to present information corresponding to a desired change in circumstances.

BRIEF DESCRIPTION OF DRAWINGS

FIG. 4 is a diagram showing a structure example of profile data.
FIG. 5 is a diagram to describe creation of profile data.
FIG. 6 is a diagram to describe creation of profile data.
FIG. 7 is a diagram to describe setting of parent topics.

DESCRIPTION OF EMBODIMENTS

Embodiments of the present invention will be described with reference to the drawings. Note that, in the description of the drawings, the same elements will be denoted by the same reference symbols and redundant description will be omitted.

(First Embodiment)

Figure 1:
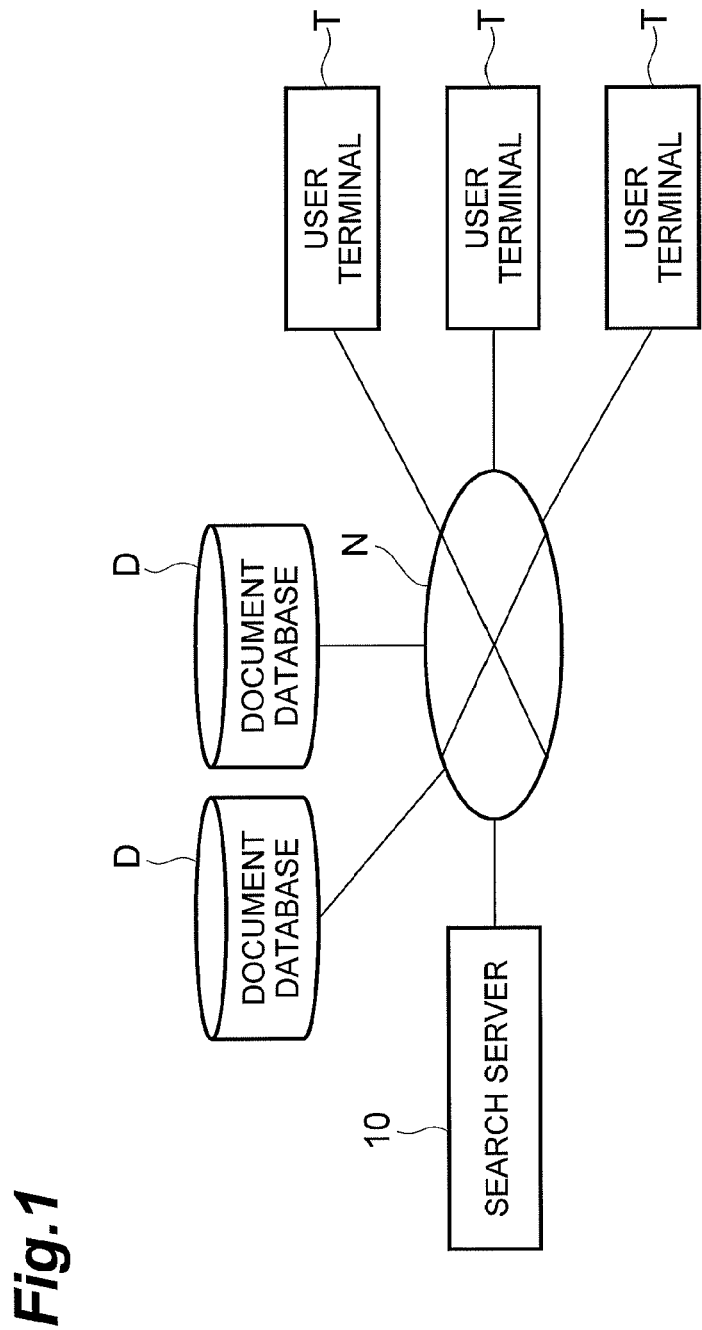
FIG. 1 is a diagram showing an overall configuration of a search system according to a first embodiment.

The function and configuration of a search server 10 according to a first embodiment are described first with reference to FIGS. 1 to 10. The search server 10 is a search device that extracts a writer (a person who has created a document) that matches a search condition specified by a user and presents the extracted writer to the user. As shown in FIG. 1, the search server 10 are connected to be able to communicate with a plurality of document databases (specified databases) D and a plurality of user terminals T through a communication network N. The search server 10, the document databases D and the user terminals T shown in FIG. 1 constitute a search system.

Prior to describing the search server 10, the document database D and the user terminal T are described. The document database D is a computer that stores documents (electronic documents) existing on the Internet. Examples of documents include blogs, microblogs, social network services (SNS), articles posted on online shopping sites and the like, although the type and contents of documents are not particularly limited. Although two document databases D are shown in FIG. 1, the number of document databases D is arbitrary. Further, the places to install the document databases D are also arbitrary, and they may be placed in a blog management system, an SNS system, an online shopping system and the like, for example.

The user terminal T is a computer that receives input of a search condition and displays a search result matching the condition. Examples of the user terminal T include sophisticated mobile phones (smartphones), personal digital assistants (PDA), various personal computers (tablet PC, desktop PC, notebook PC etc.) and like, though an example of the user terminal T is not limited thereto. Although three user terminals T are shown in FIG. 1, the number of user terminals T is arbitrary.

Figure 2:
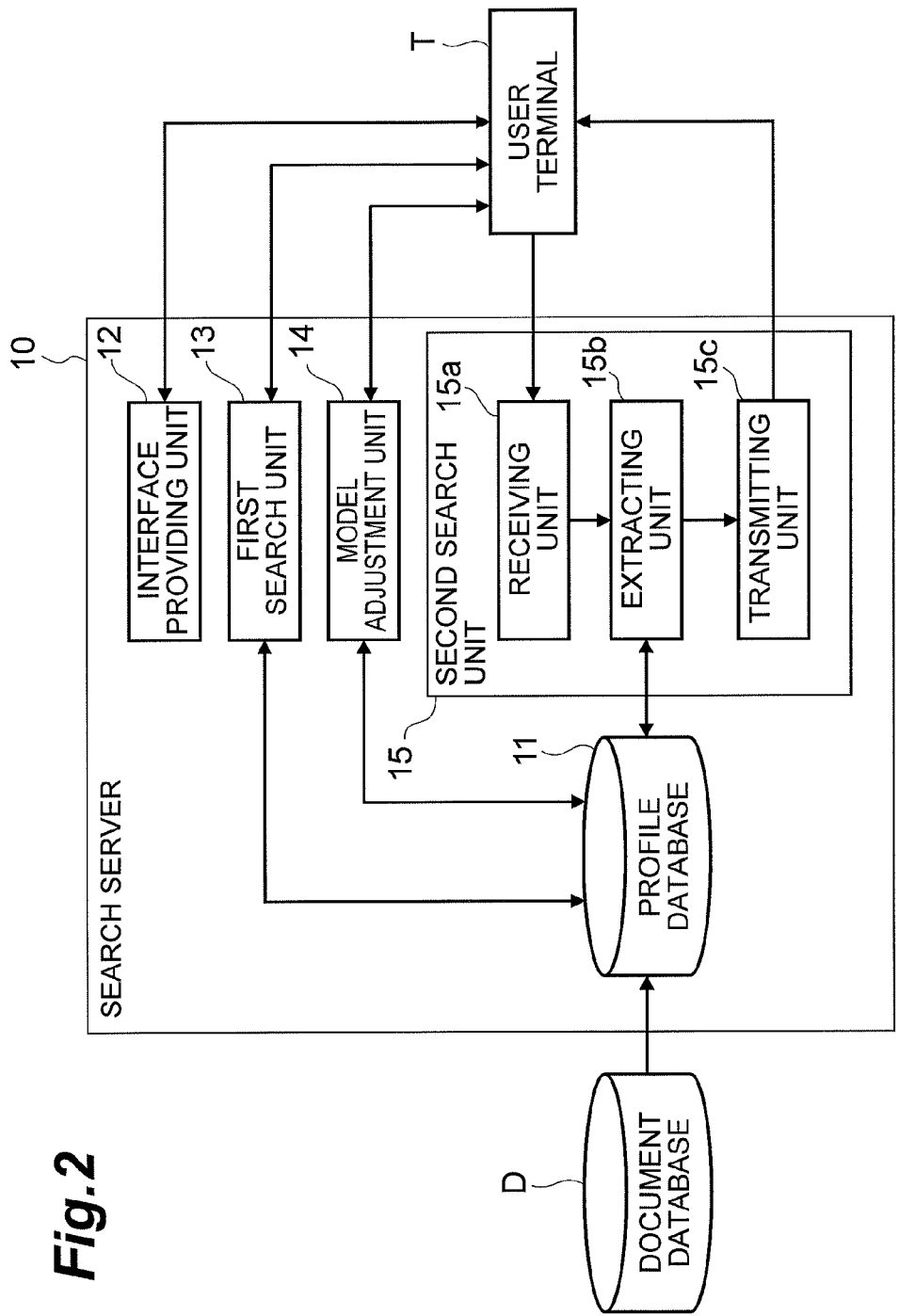
FIG. 2 is a diagram showing a functional configuration of a search server shown in FIG. 1.

Based on the above assumption, the search server 10 is described hereinafter. As shown in FIG. 2, the search server 10 includes, as functional components, a profile database 11, an interface providing unit 12, a first search unit 13, a model adjustment unit 14, and a second search unit 15.

Figure 3:
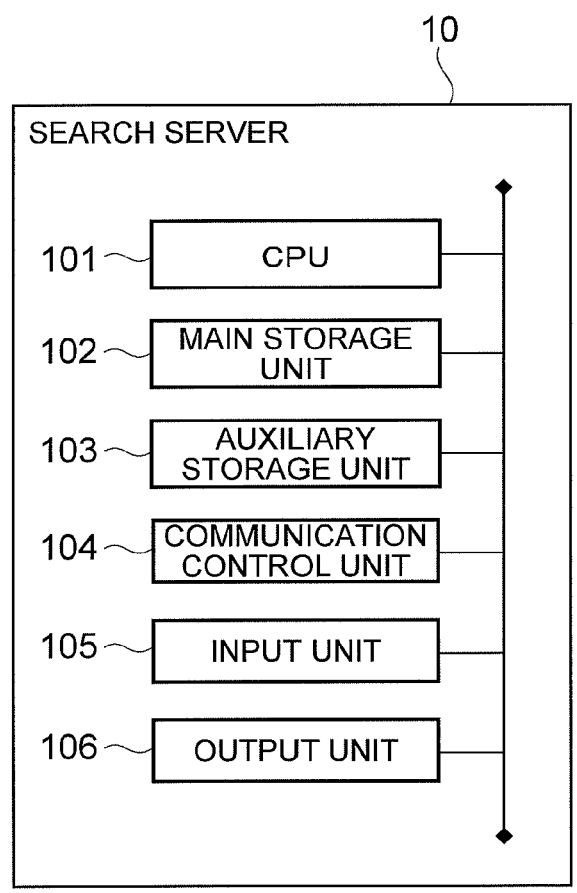
FIG. 3 is a diagram showing a hardware configuration of the search server shown in FIG. 1.

The search server 10 is composed of a CPU 101 that executes an operating system, an application program and the like, a main storage unit 102 such as ROM and RAM, an auxiliary storage unit 103 such as a hard disk or the like, a communication control unit 104 such as a network card or the like, an input unit 105 such as a keyboard and a mouse, and an output unit 106 such as a monitor as shown in FIG. 3. The functions of the search server 10 are implemented by loading given software onto the CPU 101 or the main storage unit 102, making the communication control unit 104, the input device 105, the output device 106 and the like operate under control of the CPU 101, and performing reading and writing of data in the main storage unit 102 or the auxiliary storage unit 103. The data and database required for processing are stored in the main storage unit 102 or the auxiliary storage unit 103.

Note that, although the search server 10 is a single computer in the example of in FIG. 3, the functions of the server may be distributed among a plurality of computers. For example, the search server 10 may be composed of a computer that includes the profile database 11 and a computer that includes the other functional components.

Referring back to FIG. 2, the profile database 11 is a means of storing profile data generated based on documents extracted from the document database D.

The profile data is data indicating what topic (subject) the document handles or what topic a writer mentions, and it is created for each document. As shown in FIG. 4, the profile data contains a writer ID that uniquely identifies a writer of a document, a document ID that uniquely identifies the document, the creation time of the document, and the number of words assigned to each of 100 specified topics (topics 0 to 99). The number of words assigned to each topic is also regarded as the frequency of appearance of the topic in one document.

The profile data is created by determining a plurality of topics by analyzing a set of documents and checking each document against those topics. This process is described in detail hereinbelow.

Specifically, the process first determines 100 topics using LDA (Latent Dirichlet Allocation) and Gibbs sampling. To determine topics, a sufficient number of documents created for a specified period of time are collected from the document database D. For example, 500 million documents created during the last one week are collected. For the collection, a specified application programming interface (API) may be used. For example, Streaming API may be used when collecting articles in the Twitter (registered trademark). Then, as preprocessing, user names, hashtags and the like contained in the body text are removed, and only nouns are extracted from the documents by the morphological analysis.

After that, a correspondence table of frequent words and topics is generated by applying the LDA to a set of the extracted nouns, thereby determining 100 topics. At this time, for convergence of the LDA processing, the processing is repeated a specified number of times. The number of repetitions is also regarded as the number of samplings, and the number may be set to 1000, for example. FIG. 5 shows an example of the generated correspondence table. In FIG. 5, various nouns including proper nouns such as the item name A and team X are integrated in each topic. Note that, in the example of FIG. 5, the name like "digital device" is given to each topic for the sake of convenience.

Next, the process collects a specified number of documents from the document database D for each of users required for providing a search service, using a specified API in the same manner as above. For example, 1000 documents per user are collected. A collection period in this process is an arbitrary period (for example, three months, one year, three years etc.) required to provide a search service, which is different from a period when determining topics (the last one week in the above example). Then, by applying the LDA and the Gibbs sampling to each document, words in the document are classified by topics, thereby calculating the frequency of appearance for each topic in each document. Note that, at this time, the number of samplings for each document is set to 50. Because there are random elements in the Gibbs sampling, the total result obtained by repeating the processing of 50 times per set three times is used as the frequency of appearance for each topic.

Next, unnecessary topics are eliminated according to the purpose of the search service. Because a writer having the interest specified by a terminal user (searcher) is shown to the user as a search result in this embodiment, information not related to the hobbies and preferences of a writer can be ignored. Thus, topics that are not the hobbies and preferences are eliminated. For example, the topics as shown in FIG. 6 may be eliminated. In the example of FIG. 6 also, the name like "time" is given to each topic for the sake of convenience. By this elimination, 100 topics are narrowed down to 40 topics, for example. In this manner, by removing unnecessary topics in advance, the accuracy of a writer search can be enhanced.

By the above-described process, the profile data having the data structure shown in FIG. 4 is generated and stored into the profile database 11. Note that the frequency of appearance corresponding to the eliminated topics is initialized to 0.

The number of topics appearing in any document is relatively large (for example, 40 topics), and therefore those topics are integrated into several groups to facilitate a user's search operation. For example, as shown in FIG. 7, the topics extracted by the above processing (topics left after the elimination) are associated with any of five parent topics (IT, life, politics and economics, entertainment, games and animations), and the correspondence is stored in the search server 10. Only parent topics are shown to users. The parent topics are the concept placed in the higher hierarchy of the corresponding extracted topics.

Note that a method of preparing the profile data is not limited to the above example, and the following alternative example is also possible.

First, a method of collecting documents is not particularly limited, and documents may be collected by crawling or may be collected using manpower as well. Further, the profile data may be made on a regular basis (in a dynamic fashion).

The number and range (the temporal range and the number of writers) of documents collected in each processing, the number of samplings, the number of repetitions of processing that performs a specified number of samplings per set are not limited to the above-described examples and may be set arbitrarily. Further, the elimination of unnecessary topics and the integration of extracted topics (setting of parent topics) may be omitted. Further, although the correspondence between words and topics is calculated in this embodiment, the vocabulary is not limited to words, and it may be a phrase composed of a plurality of words, for example.

Referring back to FIG. 2, the interface providing unit 12 is a means of providing a user interface for search, which is a search screen, to the user terminals T. When a terminal user who intends to use a search service performs a specified operation, the user terminal T transmits a signal requesting a search screen (for example, HTTP request) to the search server 10. In response to the signal, the interface providing unit 12 transmits data of a search screen (for example, a web page) to the user terminal T. A search screen is thereby displayed on the user terminal T. Note that a method of implementing a search screen is arbitrary, and it may be implemented by a Java (registered trademark) application, not a web application.

Figure 8:
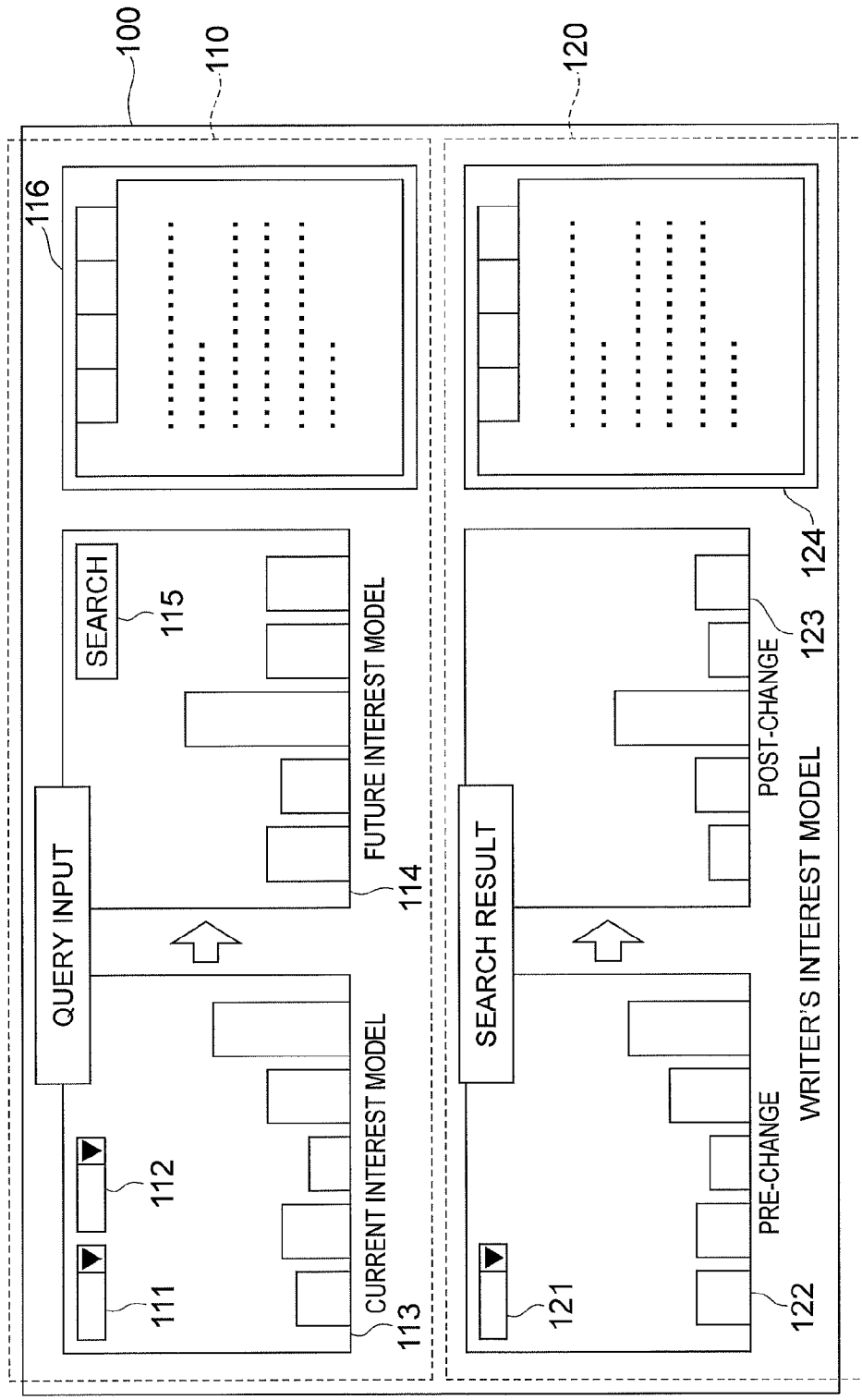
FIG. 8 is a diagram showing an example of a search screen displayed on a user terminal shown in FIG. 1.

FIG. 8 shows an example of a search screen. A search screen 100 is broadly divided into an input area 110 for inputting a search condition (query) and a display area 120 for displaying a search result.

The input area 110 includes a user input field 111, a period input field 112, a current model field 113, a future model field 114, a search button 115, and a document display field 116.

The user input field 111 is an interface for inputting a user (reference user) that serves as a reference for a writer search. A terminal user may set anyone as a reference user and, for example, may specify the oneself or another writer in the user input field 111.

The period input field 112 is an interface for inputting a period of documents to be collected for generating a current model, which is described later (a period indicating how far back documents should be collected from the present). The period is described hereinafter as "collection period".

The current model field 113 is a region that displays the frequency of appearance (first frequency of appearance) for each of the parent topics obtained by compiling the profile data of documents created by the reference user during the specified collection period in a proportion such as a percentage. The frequency of appearance for each parent topic is also referred to as "interest model" or "appearance frequency distribution". Hereinafter, the frequency of appearance for each parent topic shown in this field is referred to as "current model" or "current interest model". In this embodiment, the current model is acquired by the first search unit 13, which is described later, and displayed in a histogram as shown in FIG. 8.

The future model field 114 is an area that receives input of the frequency of appearance (second frequency of appearance) for each parent topic by a terminal user. Hereinafter, the frequency of appearance for each parent topic shown in this field is referred to as "future model" or "future interest model". In this embodiment, the future model is also shown in a proportion, and displayed in a histogram.

As an initial value of the future model, the same value as the current model is set and displayed, and a terminal user can change the future model (the value of the frequency of appearance of each parent topic) by raising or lowering the bars displayed in this field. Because the frequency of appearance of each parent topic is shown in percentage, when a terminal user changes the value of the frequency of appearance of a certain parent topic, the frequencies of appearance of the other topics are automatically adjusted. Specifically, the user terminal T transmits, to the search server 10, data of the current model, change information indicating a changed parent topic, and an unadjusted future model (future model before adjustment) containing the frequency of appearance after changing the parent topic. After that, the user terminal T receives data of the future model that has been adjusted in the model adjustment unit 14 (which is described later) of the search server 10 and displays the data in the future model field 114. In this manner, when the frequency of appearance of a certain specified topic is changed, the frequencies of appearance of the other topics are adjusted accordingly, which enhances the convenience of a search operation.

The search button 115 is an interface for giving the search server 10 an instruction to make a search according to the search condition specified in the input area 110.

The document display field 116 is a region to display documents used for obtaining the current model in response to an instruction from a terminal user. The documents displayed in this field are documents whose writer ID is the reference user ID and whose period of creation is included in the collection period, which are read from the document database D.

The display area 120 includes a writer selection field 121, a pre-change model field 122, a post-change model 123, and a document display field 124.

The writer selection field 121 is an interface for selecting one writer from one or more retrieved writers (writers exhibiting the identical or similar change in the interest model as the search condition).

The pre-change model field 122 is a region to display the interest model that is identical or similar to the current model (which is referred to hereinafter as "pre-change model" or "pre-change interest model") for the writer selected in the writer selection field.

The pre-change model field 122 is a region to display the interest model that is identical or similar to the future model (which is referred to hereinafter as "post-change model" or "post-change interest model") for the writer selected in the writer selection field.

The document display field 124 is a region to display documents of the writer selected in the writer selection field 121 in response to an instruction from a terminal user. The documents displayed in this field are documents whose writer ID is that of the selected writer and whose period of creation is included in a period coinciding with the pre-change model or the post-change model, which are read from the document database D.

A method of representing the interest model is not limited to a histogram and may be decided arbitrarily. For example, the interest model may be represented using a pie chart.

Referring back to FIG. 2, the first search unit 13 is a means of generating the current model based on the profile data in the profile database 11. When a reference user and a collection period are input in the search screen 100, the user terminal T transmits a search condition (which is also referred to hereinafter as "first search condition") indicating the user ID of the reference user and the collection period to the search server 10. The first search unit 13 receives the search condition and reads profile data whose writer ID is the user ID of the reference user and whose period of creation is included in the collection period from the profile database 11. The first search unit 13 then compiles the frequency of appearance for each parent topic based on the frequencies of appearance of the topics 0 to 99 indicated by the extracted profile data and the correspondence table as shown in FIG. 7. Then, the first search unit 13 converts the compilation result of each parent topic into a proportion and transmits the converted result as the interest model to the user terminal T. The current model is thereby displayed in a histogram in the current model field 113.

The model adjustment unit 14 is a means of adjusting each frequency of appearance in the future model according to an operation to change the future model on the search screen 100. The model adjustment unit 14 adjusts each frequency of appearance in the future model based on the current model, the change information and the unadjusted future model received from the user terminal T. Although a method of the adjustment may be decided arbitrarily, two adjustment methods are described below.

A first method is a similar interest model reference method that sets the interest model most similar to a specified change as the future model after adjustment by reference to the transition of the interest model of another writer. This method is described hereinafter using FIG. 9.

If the frequency of appearance of the i-th parent topic in the current model and the unadjusted future model is $T_i^C$ and $T_i^D$, respectively, the current model is represented as the vector $T^C = \{T_0^C, T_1^C, T_2^C, T_3^C, T_4^C\}^t$, and the unadjusted future model (desired future model) is represented by the vector $T^D = \{T_0^D, T_1^D, T_2^D, T_3^D, T_4^D\}^t$, where t indicates inversion. When the frequency of appearance is changed only for some parent topics, the model adjustment unit 14 searches the profile database 11 based on the current interest model and the unadjusted future model $T^D$ focusing only on the parent topics of which the frequency of appearance has been changed.

Figure 9:
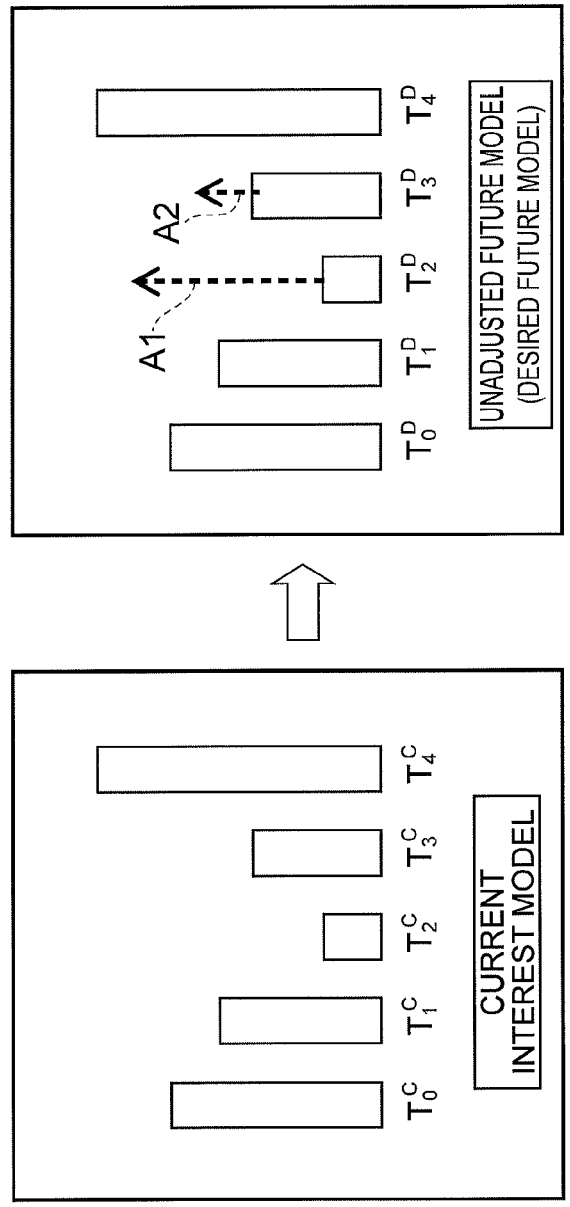
FIG. 9 is a diagram to describe an example of a method of adjusting a future model according to a user operation.

For example, when only the frequencies of appearance for the third and fourth parent topics are changed by a user as indicated by the arrows A1 and A2 as shown in FIG. 9, the model adjustment unit 14 substitutes the unadjusted future model $T^D = \{T_0^D, T_1^D, T_2^D, T_3^D, T_4^D\}^t$ with $T^D = \{*, *, T_2^D, T_3^D, *\}^t$, where "*" is wildcard. Then, the model adjustment unit 14 specifies a writer of which the first interest model during a given period (another search period) is identical or similar to the current model and the second interest model $T^F$ during a period (one search period) later than the given period is identical or similar to the unadjusted future model after substitution. Note that $T^F = \{T_0^F, T_1^F, T_2^F, T_3^F, T_4^F\}^t$. At the time of determining the identity and similarity, the model adjustment unit 14 uses the concept of Manhattan distance just like the second search unit 15 described below.

At the time of searching for the second interest model $T^F$ that is identical or similar to the unadjusted future model after substitution, the model adjustment unit 14 calculates the Manhattan distance only for the changed frequencies of appearance (in the above example, only for $T_2^D$ and $T_3^D$). Note that the total of the frequencies of appearance in each model needs to be fixed, and it is represented as the following equation (1).

Equation 1

$$\sum_i T_i^C = \sum_i T_i^D = \sum_i T_i^F = \text{const.} \tag{1}$$

Then, the model adjustment unit 14 transmits the second interest model $T^F$ of the writer with the highest similarity as the future model to the user terminal T. Thus, on the search screen 100, it is displayed so that the current model $T^C=\{T_0^C, T_1^C,T_2^C,T_3^C,T_4^C\}^t$ transitions to the future model $T^F=\{T_0^F, T_1^F,T_2^F(\approx T_2^D),T_3^F(\approx T_3^D),T_4^F\}^t$.

In the above first method, the model adjustment unit 14 may set a model different from the most similar interest model $T^F$ as the future model. For example, the model adjustment unit 14 may transmit the average of a specified number of interest models extracted in the ascending order of the Manhattan distance as the future model to the user terminal T. Further, the model adjustment unit 14 may transmit the average of interest models whose Manhattan distance is a specified value or less as the future model to the user terminal T.

A second method is a topic propagation method that adjusts each frequency of appearance in the future model in consideration of the relation between parent topics. At the time of associating each word with a topic by the LDA, there is a case where one word belongs to a plurality of topics. The frequency of overlap of words causes a relation to arise between topics, and thereby a relation arises between parent topics as well. The topic propagation method uses a weight indicating the strength of each relation between parent topics. This method is described hereinafter using FIG. 10.

Figure 10:
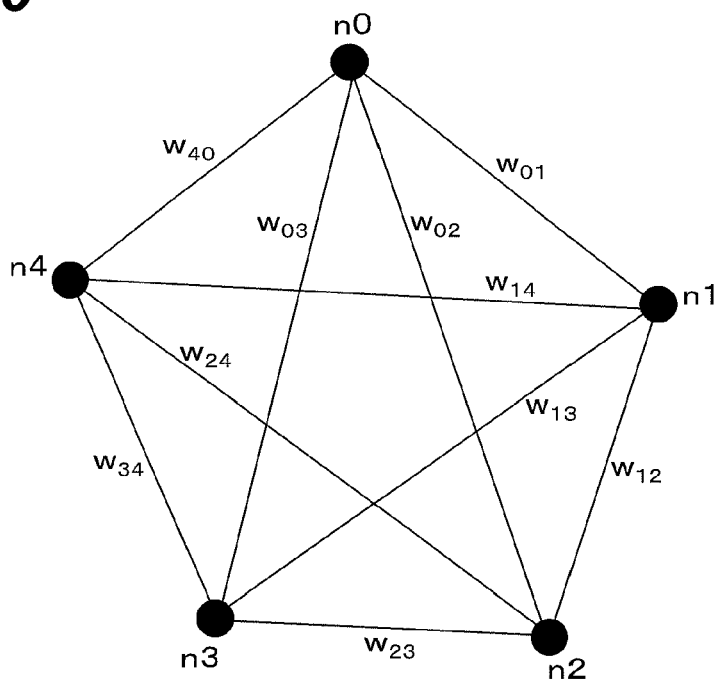
FIG. 10 is a diagram to describe another example of a method of adjusting a future model according to a user operation.

As shown in FIG. 10, five parent topics are represented by nodes n0 to n4, and a weight between two topics is represented by $w_{ij}$ (i and j are the number of nodes adjacent to each other). Note that the weight w is prestored in a specified storage means in the search server 10 and referred to by the model adjustment unit 14.

Based on the above, it is assumed that the frequency of appearance corresponding to the node n2 is changed by v by a user operation. Because the weights related to the node n2 are $w_{02}$, $w_{12}$, $w_{23}$ and $w_{24}$, it is necessary to determine the amount of the frequency of appearance to be transferred to or from each of the other nodes n0, n1, n3 and n4 in order to change the frequency of appearance of the node n2. Assuming that $w_T=w_{02}+w_{12}+w_{23}+w_{24}$, the model adjustment unit 14 determines the amount of transfer between the node n2 and the other nodes as follows.

With the node n0, $v(w_{02}/w_T)$
With the node n1, $v(w_{12}/w_T)$
With the node n3, $v(w_{23}/w_T)$
With the node n4, $v(w_{24}/w_T)$ Note that, however, when v>0, which is when the frequency of appearance is increased for the node n2, there is a case where the frequency of appearance of another node becomes negative by the above calculation. In such a case, the model adjustment unit 14 transfers the frequency of appearance back from the node n2 to that node until the frequency of appearance of that node gets back to 0. Then, the model adjustment unit 14 performs the processing of transferring a shortfall amount v' for the node n2 from anther node (excluding the node whose frequency of appearance has been set back to 0) in the same manner as above. Note that, when the frequencies of appearance of a plurality of topics are changed by a user operation, the model adjustment unit 14 may perform the above adjustment on the amount of change $V_k$ (k is a node number) of each node (each topic). The model adjustment unit 14 transmits the future model after adjustment to the user terminal T. The adjusted future model is thereby displayed on the search screen 100.

Referring back to FIG. 2, the second search unit 15 is a means of searching for a writer matching a search condition specified in the input area 110 of the search screen 100 (which is also referred to hereinafter as "second search condition"). The second search unit 15 includes a receiving unit 15a, an extracting unit (search means) 15b, and a transmitting unit (output means) 15c.

The receiving unit 15a is a means of receiving a search condition from the user terminal T. When the search button 115 on the search screen 100 is clicked by a terminal user, the user terminal T transmits a search condition to the search server 10, and the receiving unit 15a receives the search condition. The receiving unit 15a outputs the received search condition to the extracting unit 15b.

This search condition (second search condition) contains the user ID of a terminal user, the user ID of a reference user, the collection period, the current model corresponding to the collection period, and the future model. The current model corresponding to the collection period is equal to a first frequency of appearance for each parent topic in the first specified period (collection period). Further, the future model is equal to a second frequency of appearance for each parent topic in the second specified period (a certain point or period in the future). In this embodiment, five parent topics are treated as the specified topics.

The extracting unit 15b is a means of extracting a writer matching the input search condition based on the profile data in the profile database 11. The extracting unit 15b sets a user different from the terminal user and the reference user as a writer as a search target. In other words, the extracting unit 15b makes a search for the profile data having a writer ID different from any of the input two user IDs. Thus, an identifier that specifies a search target is a writer ID.

The extracting unit 15b performs the following search for each search target writer. Specifically, the extracting unit 15b reads profile data corresponding to an arbitrary period that coincides with the input collection period (which is also referred to hereinafter as "start period" and which equals to a first search target period) from the profile database 11. Although the start and end points of the period is different between the start period and the collection period, the length of the period is the same. The exact length, however, may be different. For example, when the collection period is the last one month, which is 30 days from April 1 to April 30, the start period may be 31 days from March 1 to March 31 or 28 days from February 1 to February 28.

Next, the extracting unit 15b compiles the frequencies of appearance indicated by the read one or more profile data with respect to each parent topic and thereby generates the interest model in the start period. The extracting unit 15b then determines whether the generated interest model is identical or similar to the current model.

At the time of determining the identity and similarity of the interest model, the extracting unit 15b uses the Manhattan distance $d_1(x,y)$ represented by the following equation (1).

Equation 2

$$d_1(x, y) = \sum_{k=1}^{n} |x_k - y_k| \qquad (2)$$

In the above equation, x in the left-hand side is the vector of the interest model that is set as a search condition, and y in the left-hand side is the vector of the interest model for a search target writer. Further, n is the number of parent topics, which is n=5 in this embodiment. $x_k$ in the right-hand side is the frequency of appearance (percentage) of a parent topic k in the interest model that is set as a search condition, and $y_k$ in the right-hand side is the frequency of appearance (percentage) of a parent topic k in the interest model for a writer as a search target. The vectors x and y are represented as $x=\{x_1,x_2,x_3,x_4,x_5\}$ and $y=\{y_1,y_2,y_3,y_4,y_5\}$, respectively.

The extracting unit 15b determines that the interest model during the start period is identical or similar to the current model when the above-described Manhattan distance is a specified threshold or less. Note that a method of deciding the threshold is arbitrary. If the Manhattan distance is 0, it means that the interest model identical to the current model is obtained.

Further, the extracting unit 15b reads profile data corresponding to an arbitrary period having the same length as the collection period and with the start point being later than the start period (which is also referred to hereinafter as "end period" and which equals to a second search target period) from the profile database 11. The relationship of the start and end points and the length of the period between the end period and the collection period is the same as that mentioned for the start period. Next, the extracting unit 15b compiles the frequencies of appearance shown in the read one or more profile data with respect to each parent topic and thereby generates the interest model in the end period. The extracting unit 15b then determines whether the generated interest model is identical or similar to the future model. In the case of making this determination also, the extracting unit 15b determines the identity and similarity in the same manner as the case of the start period using the Manhattan distance $d_1(x,y)$ represented by the above equation (1).

The extracting unit 15b extracts a combination of interest models where the Manhattan distance is a specified threshold or less in the start period and the end period, varying those two periods for one writer. Then, the extracting unit 15b stores two interest models corresponding to the start period and the end period in this combination as a pre-change model and a post-change model, respectively. Further, the extracting unit 15b also stores the start period and the end period corresponding to the pre- and post-change interest models. Note that when a plurality of combinations of pre- and post-change interest models which are identical or similar to the search condition are obtained, the extracting unit 15b may select one combination by an arbitrary method. For example, the extracting unit 15b may select the combination with the smallest total or average of the Manhattan distance.

The extracting unit 15b performs the above processing for each writer and acquires the writer ID, the pre-change model, the post-change model, and the start period and the end period corresponding to those models, for one or more writers that match the input search condition. The extracting unit 15b then outputs those acquired data as a search result to the transmitting unit 15c.

The transmitting unit 15c is a means of transmitting an input search result to the user terminal T to present the search result to a terminal user. The pre-change model and the post-change model are thereby displayed in the display area 120 of the search screen 100 which is displayed on the user terminal T.

Figure 11:
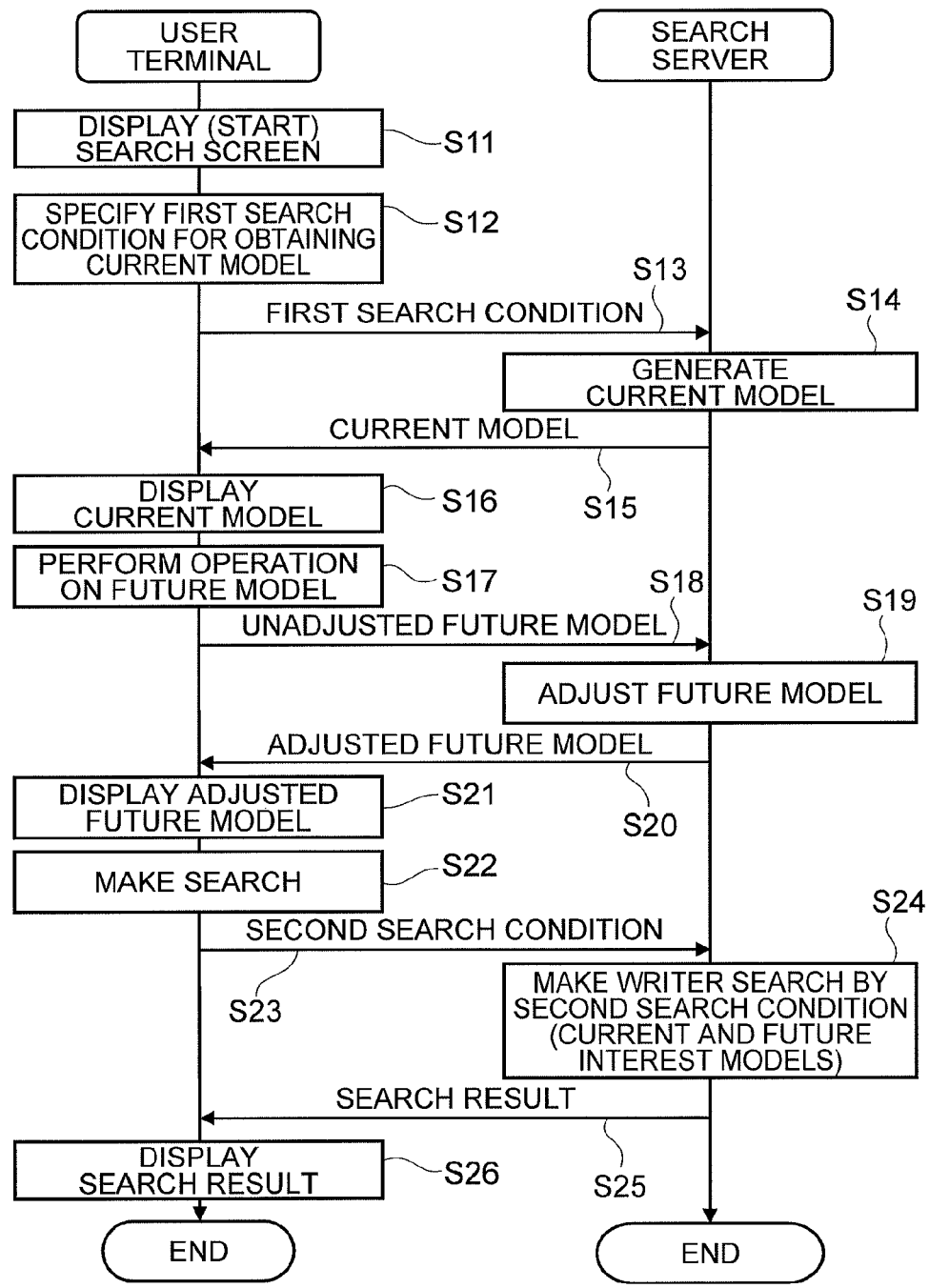
FIG. 11 is a sequence chart showing an operation of the search system shown in FIG. 1.

The operation of the search system (particularly, the search server 10) is described, and a search method according to this embodiment is also described hereinafter with reference to FIG. 11.

The following description is based on the assumption that the search screen 100 is displayed on the user terminal T (Step S11). When the first search condition for obtaining the current model, which is the reference user and the collection period, is specified by a terminal user (Step S12), the user terminal T transmits the first search condition to the search server 10 (Step S13). In the search server 10, the first search unit 13 extracts profile data from the profile database 11 based on the search condition and generates the current model based on the profile data (Step S14). Then, the first search unit 13 transmits the current model to the user terminal T (Step S15). In the user terminal T, the current model is displayed on the search screen 100 (Step S16). At this time, the same value as the current model is set and displayed as an initial value of the future model in this embodiment.

After that, when the frequency of appearance in the future model is changed by a terminal user (Step S17), the user terminal T transmits the unadjusted future model indicating the change to the search server 10 (Step S18). In the search server 10, the model adjustment unit 14 adjusts the future model by applying a technique such as the similar interest model reference method or the topic propagation method to the unadjusted future model (Step S19) and transmits the adjusted future model to the user terminal T (Step S20). In the user terminal T, the future model after adjustment is displayed on the search screen 100 (Step S21). The processing of Steps S17 to S21 can be performed repeatedly according to an operation by a terminal user.

After that, when the terminal user instructs a search by clicking the search button 115 (Step S22), the user terminal T transmits a condition for searching for a writer, which is the second search condition containing the current and future interest models, to the search server 10 (Step S23).

In the search server 10, the receiving unit 15a receives the search condition. Then, the extracting unit 15b extracts profile data from the profile database 11 based on the search condition and searches for a writer based on the profile data (Step S24, search step). Specifically, the extracting unit 15b extracts a writer of which the interest model in the start period is identical or similar to the current model and the interest model in the end period is identical or similar to the future model by using the concept of Manhattan distance. At this time, the extracting unit 15b stores the generated and determined interest models as the pre-change model and the post-change model. Then, the transmitting unit 15c transmits the extracted writer, together with the pre- and post-change interest models, as a search result to the user terminal T (Step S25, transmitting step). In the user terminal T, the search result is displayed on the search screen 100 (Step S26). A terminal user can thereby obtain the search result.

Figure 12:
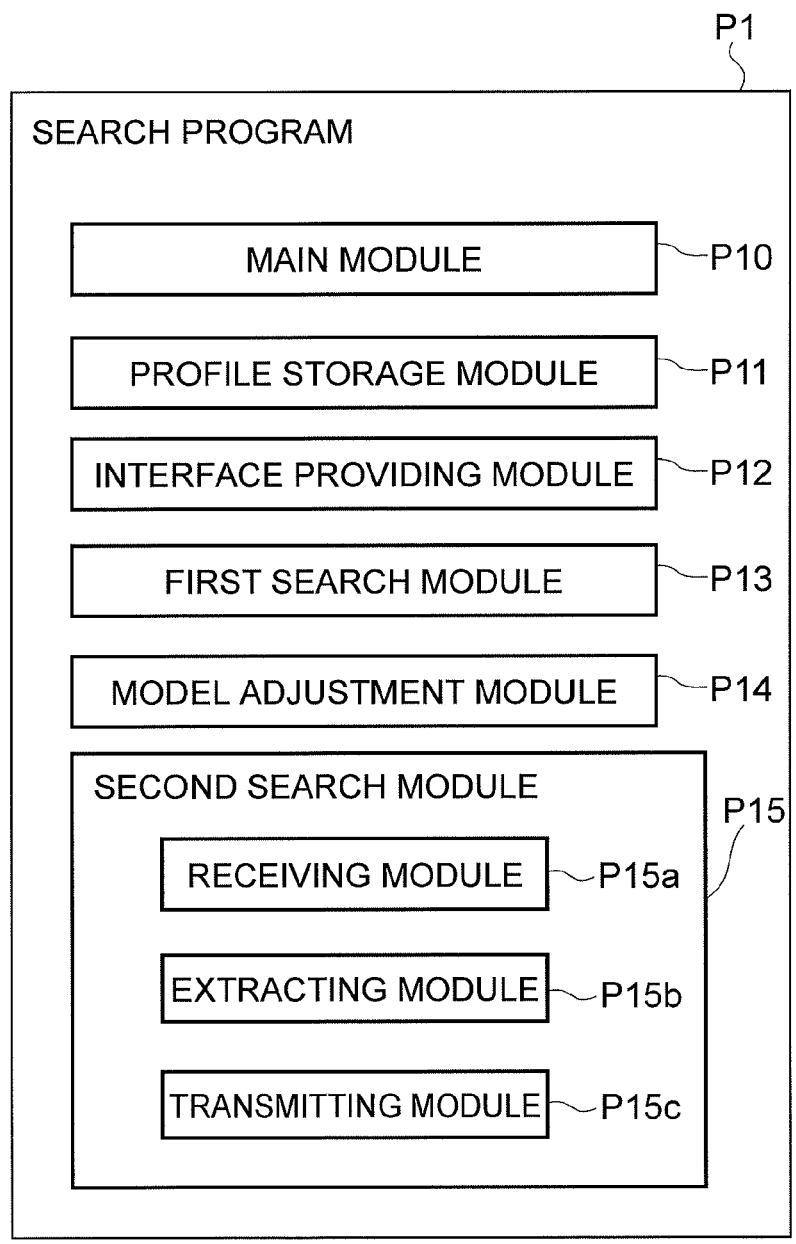
FIG. 12 is a diagram showing a structure of a search program according to the first embodiment.

A search program P1 for causing a computer to function as the search server 10 is described hereinafter with reference to FIG. 12.

The search program P1 includes a main module P10, a profile storage module P11, an interface providing module P12, a first search module P13, a model adjustment module P14, and a second search module P15. The second search module P15 includes a receiving module P15a, an extracting module P15b, and a transmitting module P15c.

The main module P10 is a part that exercises control over the search function. The functions implemented by executing the profile storage module P11, the interface providing module P12, the first search module P13, the model adjustment module P14, and the second search module P15 are equal to the functions of the profile database 11, the interface providing unit 12, the first search unit 13, the model adjustment unit 14 and the second search unit 15 described above, respectively. The functions implemented by executing the receiving module P15a, the extracting module P15b, and the transmitting module P15c are equal to the functions of the receiving unit 15a, the extracting unit 15b and the transmitting unit 15c described above, respectively.

The search program P1 is provided in the form of being recorded in a static manner on a tangible recording medium such as CD-ROM, DVD-ROM or semiconductor memory, for example. Further, the search program P1 may be provided as a data signal superimposed onto a carrier wave through a communication network.

As described above, according to this embodiment, a writer having the two frequencies of appearance (the pre-change and post-change interest models) that are identical or similar to the frequencies of appearance for each specified topic in two periods (the current and future interest models) is extracted. Then, the extracted writer is transmitted as a search result to the user terminal T and displayed on the search screen 100. In this manner, by extracting a writer whose change in the frequency of appearance for a specified topic is identical or similar to the search condition, it is possible to present information of a writer whose interest has changed as designated by a user to the user. Note that a change in the interest of a writer is one kind of a change in circumstances.

(Second Embodiment)

The function and configuration of a search server 10A according to a second embodiment are described hereinafter with reference to FIGS. 13 to 14. The search server 10A is different from the search server 10 according to the first embodiment in that it provides information about an item purchased by a retrieved writer or an item corresponding to a change in the interest model of the writer to the user terminal, not only making a writer search. The same or equivalent description as in the first embodiment is omitted below.

Figure 13:
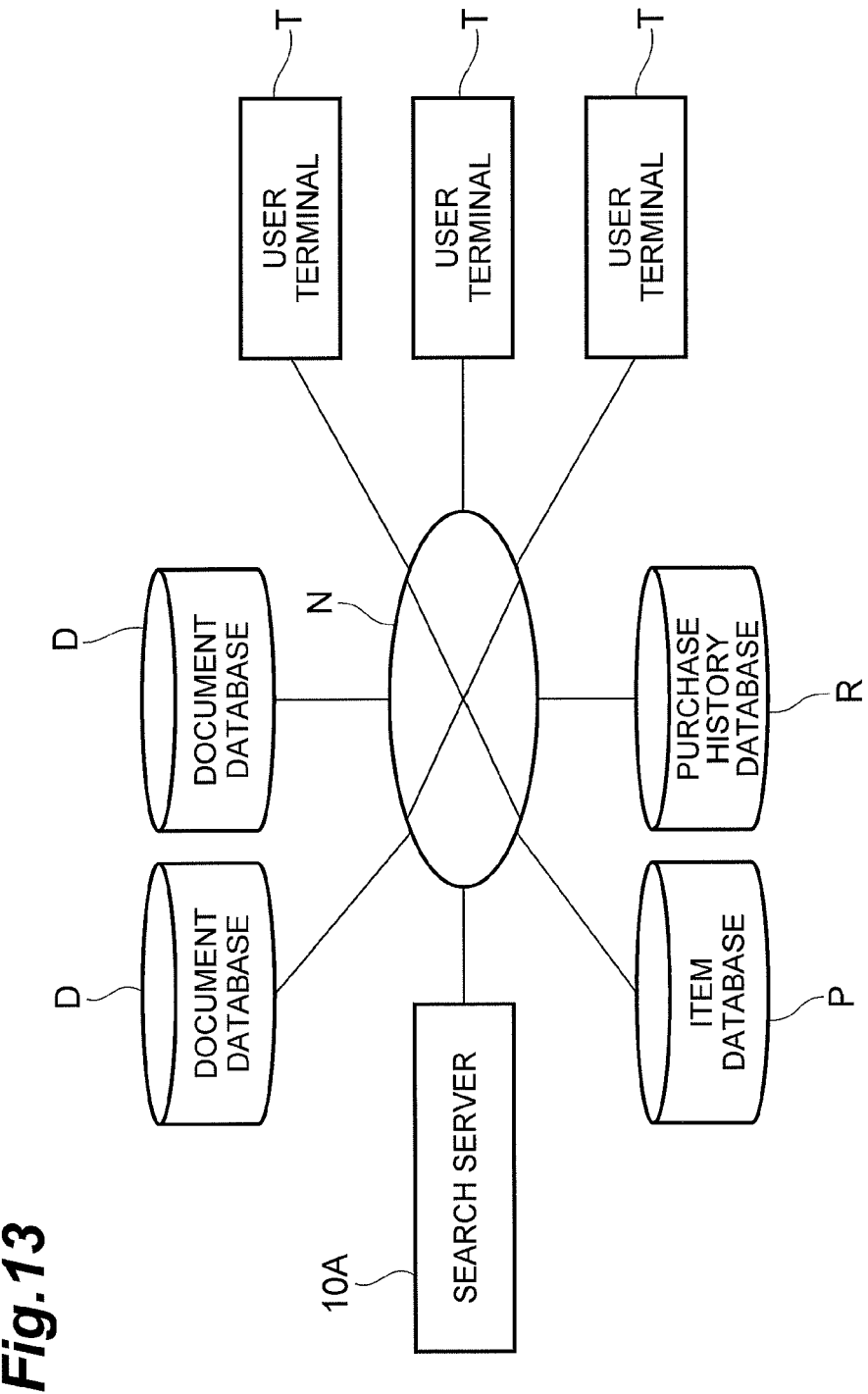
FIG. 13 is a diagram showing an overall configuration of a search system according to a second embodiment.

As shown in FIG. 13, a search system according to this embodiment further includes an item database P and a purchase history database R, which are additional databases. The item database P is a means of storing item data containing an item ID that identifies an item and arbitrary item attributes such as the name, category, price, and image of the item. Further, the purchase history database R is a means of storing purchase data containing a user ID that identifies a user who has purchased an item, the item ID of the item, and the date and time of purchase. The item database P and the purchase history database R may be placed in an online shopping system, for example, but those databases may be placed anywhere and not necessarily placed within one system. Further, although one item database P and one purchase history database R are shown in FIG. 1, the number of those databases is not particularly limited. The search server 10A can communicate also with the item database P and the purchase history database R through the communication network N.

Figure 14:
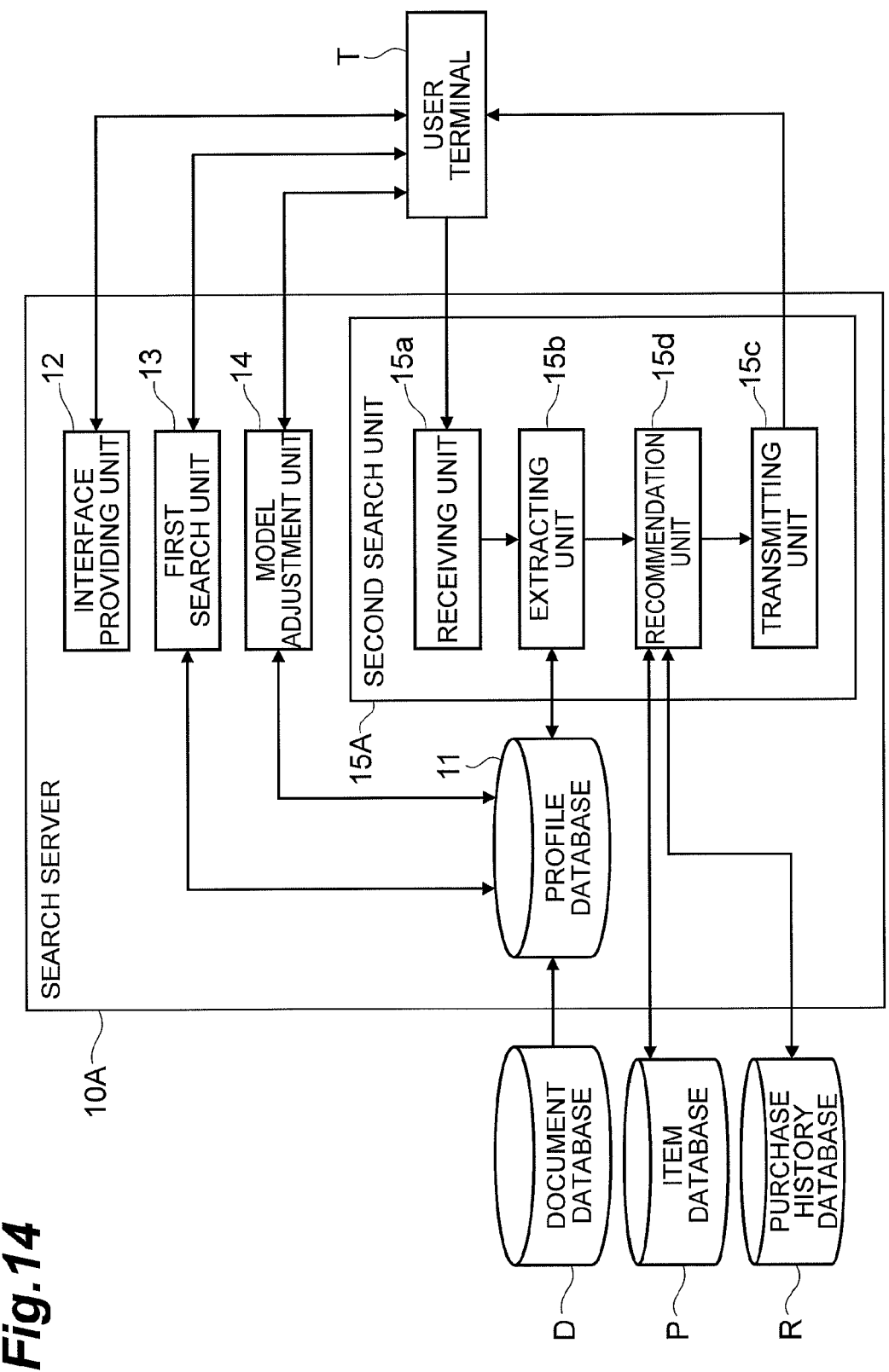
FIG. 14 is a diagram showing a functional configuration of a search server shown in FIG. 13.

As shown in FIG. 14, the search server 10A includes, as functional components, a profile database 11, an interface providing unit 12, a first search unit 13, a model adjustment unit 14, and a second search unit 15A. The second search unit 15A, which is a difference from the first embodiment, is described hereinbelow.

The second search unit 15A includes a receiving unit 15a, an extracting unit 15b, a recommendation unit (search means) 15d, and a transmitting unit 15c. The functions of the receiving unit 15a and the transmitting unit 15c are the same as those described in the first embodiment. Further, although the extracting unit 15b is different from the one in the first embodiment in that it outputs a search result to the recommendation unit 15d, the details of the function of obtaining the search result are the same as those described in the first embodiment. Thus, the description on the receiving unit 15a, the extracting unit 15b and the transmitting unit 15c is omitted, and only the recommendation unit 15d is described hereinbelow.

The recommendation unit 15d is a means of extracting a recommended item to be shown to a terminal user. Two extraction methods are described in this example.

A first method is a method that extracts an item related to a retrieved writer. The recommendation unit 15d performs the following processing for each of writers shown in the input search result.

The recommendation unit 15d refers to the start period and the end period corresponding to the pre-change model and the post-change model of one writer and acquires a time interval between those two periods as a transition period. Note that the start point of the transition period is the start or end point of the start period, and the end point of the transition period is the start or end point of the end period.

Next, the recommendation unit 15d reads purchase data where a user ID is the user ID of the writer and the date and time of purchase is included in the transition period from the purchase history database and thereby acquires the item ID of an item purchased by the writer during the transition period.

When one or more item IDs are acquired, the recommendation unit 15d reads the item data corresponding to the item IDs from the item database P and generates recommendation information (additional information) containing an item name, price, item image and the like. Note that, at this time, the recommendation unit 15d may compare the categories of items indicated by the item data with five parent topics and generate the recommendation information only for the item that belongs to the category corresponding to any of the parent topics.

For example, the recommendation unit 15d may extract only the item that belongs to the category corresponding to the parent topic whose frequency of appearance is the highest among the post-change models. Further, the recommendation unit 15d may extract only the item that belongs to the category corresponding to the parent topic whose frequency of appearance is specified value or more among the post-change models. Furthermore, the recommendation unit 15d may extract only the item that belongs to the category corresponding to the topic whose frequency of appearance has increased the most in the process of transition from the pre-change model to the post-change model. The correspondence between a topic and an item category may be set arbitrarily, and the recommendation unit 15d pre-stores data indicating the correspondence inside.

After generating the recommendation information, the recommendation unit 15d adds the recommendation information to the input search result and transmits the search result to the transmitting unit 15c.

On the other hand, when no item ID is acquired, the recommendation unit 15d transmits the input search result as it is to the transmitting unit 15c.

A second method is a method that, based on a transition pattern indicating the way of transition from the pre-change model to the post-change model, extracts an item in a category corresponding to a topic indicated by those models.

It is assumed that time s is needed to reach the post-change model from the pre-change model, and the point of time of the pre-change model is t=0, and the point of time of the post-change model is t=s. Then, the pre-change and post-change interest models are K(0) and K(s), respectively, and a function indicating the interest model at time t is represented as $K(t)=\{K_0^t, K_1^t, K_2^t, K_3^t, K_4^t\}^T$, where T indicates inversion. At this time, the value K(t) can be defined as the following equation (3) using an arbitrary function f(t).

$$K(t)=K(0)+(K(s)-K(0))*f(t)$$

The function f(t) may be a simple linear function (t/s) or a function that transitions like an exponential function or a logarithmic function. For example, when the function f(t) is a linear function, the function K(t) indicates a transition model (linear model) that "increases at a constant speed". Further, when the function f(t) is an exponential function, the function K(t) indicates a transition model (exponential model) that "increases slowly at first and then increases exponentially". Further, when the function f(t) is a logarithmic function, the function K(t) indicates a transition model (logarithmic model) that "increases rapidly at first and then increases slowly". Note that the recommendation unit 15d may acquire a plurality of functions K(t).

Then, the recommendation unit 15d reads an item corresponding to the acquired transition model from the item database P. It is assumed in this processing that the item data contains not only the category of an item but also the type of the corresponding transition model (for example, linear model, exponential model, logarithmic model etc.) and data indicating which point of time of the transition model (for example, first half, midpoint, latter half etc.) the item corresponds to. For example, for each of the acquired transition model (function K(t)), the recommendation unit 15d reads an item which has the category corresponding to the parent topic indicated by the transition model and for which the type of the transition model corresponding to the function K(t) is designated from the item database P. When one or more item data is acquired, the recommendation unit 15d generates recommendation information (additional information) for each transition model based on the item data. The recommendation unit 15d then adds the generated recommendation information to the input search result and transmits the search result to the transmitting unit 15c.

The search result containing the recommended item information is received and displayed on the user terminal T. The way of displaying the recommended item information may be decided arbitrarily. For example, a region for displaying the recommended items may be placed in the search screen, or the recommended items may be displayed on another screen. In any case, a terminal user can know what items a retrieved writer has purchased in the process that the interest of the writer has changed.

Figure 15:
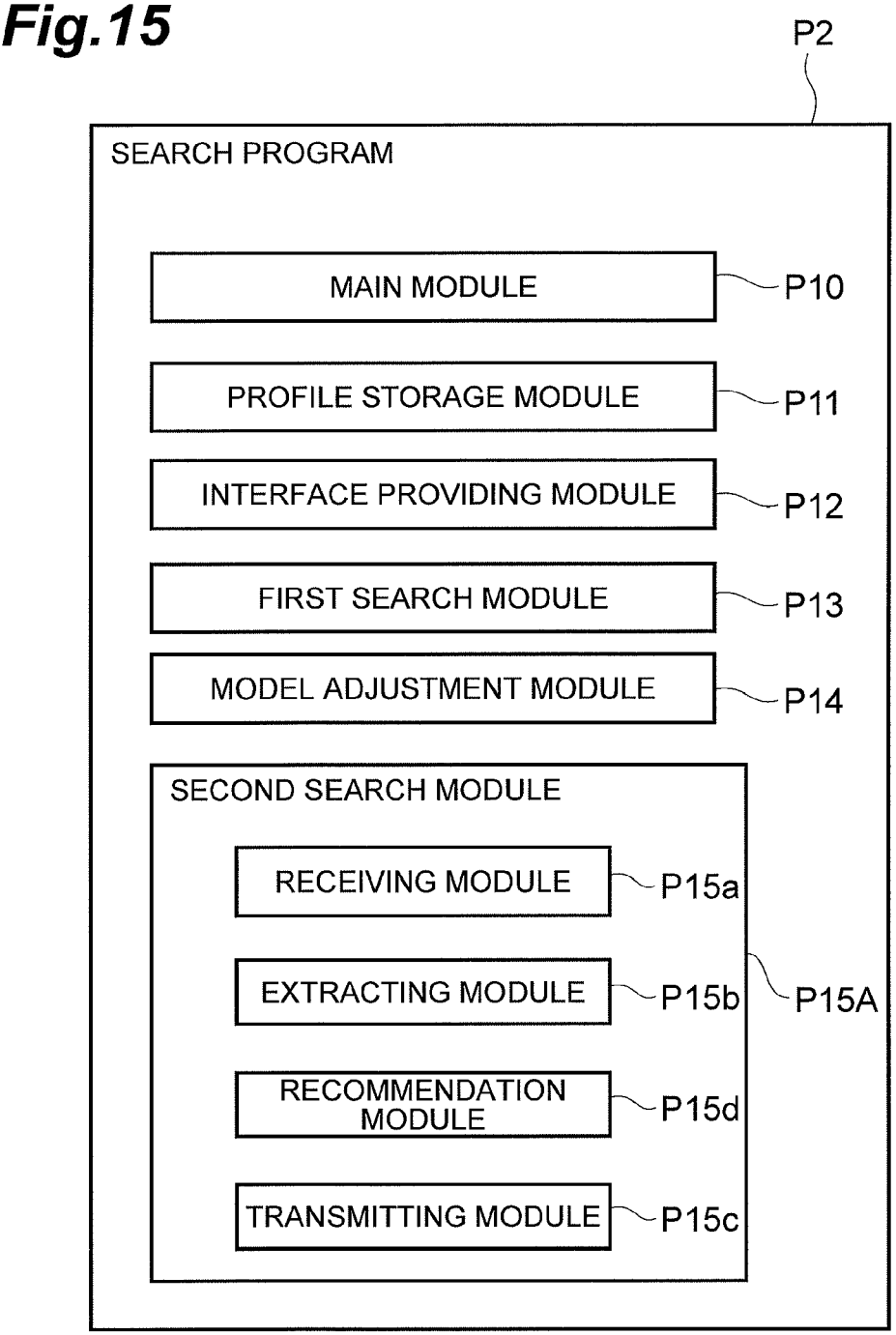
FIG. 15 is a diagram showing a structure of a search program according to the second embodiment.

A search program P2 for causing a computer to function as the search server 10A is described hereinafter with reference to FIG. 15.

The search program P2 is different from the search program P1 according to the first embodiment in that it includes a second search module P15A including a recommendation module P15d in place of the second search module P15. The functions implemented by executing the second search module P15A are equal to the functions of the second search unit 15A. The functions implemented by executing the recommendation module P15d are equal to the functions of the recommendation unit 15d described above. The search program P2 is also provided in the same manner as the search program P1.

In this embodiment also, the same advantages as the first embodiment can be obtained. In addition, in this embodiment, the recommendation information corresponding to a writer or transition pattern is also transmitted as additional information to the user terminal T. Thus, a user can obtain not only information of a writer whose interest model has changed as designated in the search condition but also information related to the writer or the transition pattern.

The embodiments of the present invention are described in detail above. However, the present invention is not restricted to the above-described embodiments, and various changes and modifications may be made without departing from the scope of the invention.

Although the search condition contains two interest models, i.e. the current model and the future model, in each of the above-described embodiments, the number of interest models (the frequency of appearance for each specified topic) contained in the search condition may be three or more. Specifically, not only the current model and the future model at the final reach point but also the interest model at one or more intermediate points between the present and the final reach point (a third frequency of appearance for each specified topic in a third specified period) may be contained in the search condition.

Although the collection period corresponding to the current model (first specified period) is a period from a specified point in the past to the present, and the period corresponding to the future model (second specified period) is a certain point or period in the future in each of the above-described embodiments, those specified periods may be set arbitrarily. For example, one month from the present to three to two months ago may be set as the first specified period, and one month from the present to two to one month ago may be set as the second specified period. In other words, both of the specified periods set as the search condition may be periods in the past. On the contrary, both of the specified periods may be periods in the future. Further, each specified period may be a certain point (time), not a period having a certain interval. Accordingly, a period (search target period) corresponding to each interest model shown in the search result may be a certain point (time), not a period.

In this case, the extracting unit 15b extracts a combination of interest models where the Manhattan distance is a specified threshold or less in the start period, the end period and one or more intermediate periods (third search target period) between those periods, varying those periods for one writer. A method of determining the identity and similarity of the interest model in the intermediate period is the same as the above-described method performed on the pre- and post-change interest models. Then, the extracting unit 15b stores a plurality of interest models for the start period, the end period and one or more intermediate periods in the extracted combination as a pre-change model, a post-change model, and one or more intermediate result models, respectively. The extracting unit 15b then outputs the retrieved interest models, together with the corresponding periods, as a search result to the transmitting unit 15c.

For example, it is assumed that three intermediate models Ma, Mb and Mc corresponding to time points Ta, Tb and Tc (where Ta<Tb<Tc) are input, in addition to the present model and the future model, as a search condition to the extracting unit 15b. In this case, the extracting unit 15b extracts three intermediate result models Ma', Mb' and Mc' that are identical or similar to those three models. At this time, if search target periods corresponding to the respective intermediate result models are Ta', Tb' and Tc', the relationship of Ta'<Tb'<Tc' is established. In other words, a plurality of intermediate periods as a search target maintains the before-after relationship of the intermediate points specified by the search condition.

In this manner, by making a search using three or more interest models, it is possible to make a search in consideration of the process of a change in circumstances, and it is thereby possible to present information of a writer whose interest model has gradually changed as designated by a user to the user.

In each of the above-described embodiments, a period (transition period) from the current model to the future model may be contained in the search result. In this case, the extracting unit 15b extracts the pre-change and post-change interest models further on the condition that the time interval from the start period to the end period coincides with the transition period and determines the identity and similarity of the interest models using the Manhattan distance. It is thereby possible to present information of a writer whose interest has changed as designated by a user within a specified time range to the user.

Although the interest model including a plurality of topics is used in each of the above-described embodiments, a model including only the frequency of appearance of one topic may be used. In this case, the transition of a model is represented not by a change in the percentage of each frequency of appearance but by the rate of increase or decrease of one frequency of appearance. For example, a model including one topic related to an evaluation value (for example, score or class curve) of a specific qualifying examination may be used. In the case of treating a model including one topic only, although the above-described model adjustment unit 14 is not needed, a technique of a writer search is the same as described in the above embodiments.

Although when some frequency of appearance is changed by a user operation in the future model field 114 of the search screen 100, the other frequencies of appearance are automatically adjusted in each of the above-described embodiments, such an adjustment function may be omitted to leave the adjustment to a user. In this case, the model adjustment unit 14 can be eliminated. Further, the frequency of appearance in the current model field 113 may be also changed by a user operation. In this case, the model adjustment unit 14 may adjust the current model by applying the above-described similar interest model reference method to the unadjusted current model and the future model or may adjust the current model by applying the above-described topic propagation method to the unadjusted current model. In the case of adding the intermediate model to the search condition also, the model adjustment unit 14 can adjust the intermediate model according to a user operation.

Although a writer of a document is a search target in each of the above-described embodiments, the search target is not particularly limited. For example, an item, service or the like may be the search target. In this case, profile data having a topic suitable for the search target may be generated based on comments or item reviews collected from the document database. A user can thereby find an item that has gained popularity recently, a hotel that has a better reputation than before and the like, for example.

Although the purpose of a terminal user is to search for a writer who has experienced a desired change of interest in each of the above-described embodiments, the purpose of a search is arbitrary. In relation thereto, a topic may be set arbitrarily. Further, the frequency of appearance for each topic, which is a model, may indicate a factor other than "interest". For example, profile data having a topic suitable for grasping the transition of academic ability may be prepared, and the above-described search system may be used for the purpose that a teacher instructs a student to set a goal or the purpose that a certain individual sets a goal by oneself.

Although the identity and similarity of interest models is determined using the Manhattan distance in each of the above-described embodiments, the identity and similarity may be determined using another scale or index such as the Euclidean distance.

Although the profile database 11 is placed in the search server 10, 10A in each of the above-described embodiments, the profile database may be placed outside the search server or outside the system including the search server.

Although a so-called client-server search system is constructed by the user terminal T and the search server 10, 10A in each of the above-described embodiments, the functions of the search server 10, 10A described above may be incorporated into the user terminal. In this case, a search result extracted in the user terminal is output (displayed) onto a specified monitor.

REFERENCE SIGNS LIST 10, 10A . . . search server (search device), 11 . . . profile database, 12 . . . interface providing unit, 13 . . . first search unit, 14 . . . model adjustment unit, 15, 15A . . . second search unit, 15a . . . receiving unit, 15b . . . extracting unit (search means), 15c . . . transmitting unit (output means), 15d . . . recommendation unit (search means), D . . . document database (specified database), P . . . item database (additional database), R . . . purchase history database (additional database), P1, P2 . . . search program, P10 . . . main module, P11 . . . profile storage module, P12 . . . interface providing module, P13 . . . first search module, P14 . . . model adjustment module, P15, P15A . . . search module, P15a . . . receiving module, P15b . . . extracting module, P15c . . . transmitting module, P15d . . . recommendation module, T . . . user terminal

The invention claimed is:
1. A search device, including a memory and at least one processor, comprising:
a search unit, within said processor, configured to extract a search target matching a search condition specified by a user based on profile data of the search target generated based on a document extracted from a specified database, the profile data containing an identifier for identifying the search target, creation time of the document, and a frequency of appearance for each topic obtained by classifying words in the document into one or more topics; and
an output unit, within said processor, configured to output the search target extracted by the search unit for presentation to a user, wherein
the memory stores the extracted search target;
the search condition includes a first frequency of appearance for each of one or more specified topics specified by the user in a first specified period and a second frequency of appearance for each of the one or more specified topics in a second specified period, the second specified period being later than the first specified period,
the search unit extracts the search target when:
the frequency of appearance for each of the one or more specified topics in a first search target period, as obtained from the profile data of the search target, is identical or similar to the first frequency of appearance, and
the frequency of appearance for each of the one or more specified topics in a second search target period, which is later than the first search target period, as obtained from the profile data of the search target, is identical or similar to the second frequency of appearance,
when there are a plurality of specified topics,
said at least one processor determines when a percentage of a frequency of appearance of at least one of the plurality of specified topics is changed with respect to a sum total of frequencies of appearances of all of the plurality of specified topics, and
said at least one processor adjusts percentages of frequencies of appearances of remainder of the plurality of specified topics, other than the at least one of the plurality of specified topics, based on the determination, the frequency of appearance of the at least one of the plurality of specified topics in the first search target period, as obtained from the profile data of the search target, is identical or similar to a changed frequency of appearance of the at least one of the plurality of specified topics in the first specified period, the frequency of appearance for each of the one or more specified topics in the second search target period, which is later than the first search target period, as obtained from the profile data of the search target, is identical or similar to the second frequency of appearance for each of the one or more specified topics in the second specified period, the second specified period being later than the first specified period, the percentages of frequencies of appearances of the remainder of the plurality of specified topics in the first specified period are adjusted based on frequencies of appearances corresponding to specified topics in the first search target period of the extracted search target, and a before-after relationship between the first search target period and the second search target period corresponds to a before-after relationship between the first specified period and the second specified period.

2. The search device according to claim 1, wherein
the search condition further includes a third frequency of appearance for each of the one or more specified topics in each of one or more third specified periods between the first specified period and the second specified period, and the search unit extracts the search target where the frequency of appearance in the first search target period is identical or similar to the first frequency of appearance, the frequency of appearance in the second search target period is identical or similar to the second frequency of appearance, and the frequency of appearance for each of the one or more specified topics obtained from the profile data in each of one or more third search target periods corresponding to the one or more third specified periods in a before-after relationship in time is identical or similar to the corresponding third frequency of appearance.

3. The search device according to claim 1, wherein
the search condition further includes a time interval between the specified periods adjacent to each other, and
a time interval between the search target periods adjacent to each other coincides with the corresponding time interval between the specified periods.

4. The search device according to claim 1, wherein
the one or more topics indicated by the profile data are topics left after eliminating specified unnecessary topics from a group of topics obtained based on the document extracted from the specified database.

5. The search device according to claim 1, wherein
the specified topics are higher hierarchy topics including one or more topics indicated by the profile data.

6. The search device according to claim 1, wherein
the percentages of frequencies of appearances of the remainder of the plurality of specified topics, other than the at least one of the plurality of specified topics, are adjusted based on a weight indicating a strength of a relation between the plurality of specified topics, the weight set based on a frequency at which the words appear across a plurality of different topics, and an amount of change of the frequency of appearance of the at least one of the plurality of specified topics.

7. The search device according to claim 1, wherein
the search unit further extracts additional information corresponding to the extracted search target or additional information corresponding to the frequency of appearance for each specified topic of the search target between the first search target period and the second search target period from an additional database, and the output unit further outputs the additional information extracted by the search unit for presentation to a user.

8. A search method performed by a search device, which includes a memory and at least one processor, comprising:
said processor extracting a search target matching a search condition specified by a user based on profile data of the search target generated based on a document extracted from a specified database, the profile data containing an identifier for identifying the search target, creation time of the document, and a frequency of appearance for each topic obtained by classifying words in the document into one or more topics; and said processor outputting the extracted search target for presentation to a user, wherein
the memory stores the extracted search target,
the search condition includes a first frequency of appearance for each of one or more specified topics specified by the user in a first specified period and a second frequency of appearance for each of the one or more specified topics in a second specified period being later than the first specified period, the processor extracts the search target when:
the frequency of appearance for each of the one or more specified topics in a first search target period, as obtained from the profile data of the search target, is identical or similar to the first frequency of appearance, the frequency of appearance for each of the one or more specified topics in a second search target period, which is later than the first search target period, as obtained from the profile data of the search target, is identical or similar to the second frequency of appearance, when there are a plurality of specified topics,
said processor determining when a percentage of a frequency of appearance of at least one of the plurality of specified topics is changed with respect to a sum total of frequencies of appearances of all of the plurality of specified topics, and said processor adjusting percentages of frequencies of appearances of remainder of the plurality of specified topics, other than the at least one of the plurality of specified topics, based on the determination, the frequency of appearance of the at least one of the plurality of specified topics in the first search target period, as obtained from the profile data of the search target, is identical or similar to a changed frequency of appearance of the at least one of the plurality of specified topics in the first specified period, the frequency of appearance for each of the one or more specified topics in the second search target period, which is later than the first search target period, as obtained from the profile data of the search target, is identical or similar to the second frequency of appearance for each of the one or more specified topics in the second specified period, the second specified period being later than the first specified period, the percentages of frequencies of appearances of the remainder of the plurality of specified topics in the first specified period are adjusted based on frequencies of appearances corresponding to specified topics in the first search target period of the extracted search target, and a before-after relationship between the first search target period and the second search target period corresponds to a before-after relationship between the first specified period and the second specified period.

9. A non-transitory computer readable memory medium for recording a search program causing a computer to function as:

a search unit configured to extract a search target matching a search condition specified by a user based on profile data of the search target generated based on a document extracted from a specified database, the profile data containing an identifier for identifying the search target, creation time of the document, and a frequency of appearance for each topic obtained by classifying words in the document into one or more topics; and an output unit configured to output the search target extracted by the search unit for presentation to a user, wherein the computer readable memory stores the extracted search target, the search condition includes a first frequency of appearance for each of one or more specified topics specified by the user in a first specified period and a second frequency of appearance for each of the one or more specified topics in a second specified period being later than the first specified period, the search unit extracts the search target when:

the frequency of appearance for each of the one or more specified topics in a first search target period, as obtained from the profile data of the search target, is identical or similar to the first frequency of appearance, the frequency of appearance for each of the one or more specified topics in a second search target period, which is later than the first search target period, as obtained from the profile data of the search target, is identical or similar to the second frequency of appearance, when there are a plurality of specified topics, said search program causes the computer to, determine when a percentage of a frequency of appearance of at least one of the plurality of specified topics is changed with respect to a sum total of frequencies of appearances of all of the plurality of specified topics, and adjust percentages of frequencies of appearances of remainder of the plurality of specified topics, other than the at least one of the plurality of specified topics, based on the determination, the frequency of appearance of the at least one of the plurality of specified topics in the first search target period, as obtained from the profile data of the search target, is identical or similar to a changed frequency of appearance of the at least one of the plurality of specified topics in the first specified period, the frequency of appearance for each of the one or more specified topics in the second search target period, which is later than the first search target period, as obtained from the profile data of the search target, is identical or similar to the second frequency of appearance for each of the one or more specified topics in the second specified period, the second specified period being later than the first specified period, the percentages of frequencies of appearances of the remainder of the plurality of specified topics in the first specified period are adjusted based on frequencies of appearances corresponding to specified topics in the first search target period of the extracted search target, and a before-after relationship between the first search target period and the second search target period corresponds to a before-after relationship between the first specified period and the second specified period.

* * * * *